United States Patent [19]

Levy

[11] Patent Number: 4,643,381

[45] Date of Patent: Feb. 17, 1987

[54] DASHBOARD TRAY

[75] Inventor: Leon M. Levy, Chicago, Ill.

[73] Assignee: Rogers Merchandising, Inc., Lombard, Ill.

[21] Appl. No.: 695,809

[22] Filed: Jan. 28, 1985

[51] Int. Cl.$^4$ .............................................. A47G 23/02
[52] U.S. Cl. ...................................... 248/154; D7/45; 248/346.1; 248/500
[58] Field of Search .............. 248/500, 146, 154, 310, 248/346.1; 108/45, 46, 49, 26; 220/85 H; D7/45, 37, 311; 229/1.5 H

[56] References Cited

U.S. PATENT DOCUMENTS

| D. 279,850 | 7/1985 | Brooker et al. | D7/45 X |
|---|---|---|---|
| 2,602,311 | 7/1952 | Hansen | 220/85 H X |
| 2,689,156 | 9/1954 | Kolander | 108/45 |
| 2,829,779 | 4/1958 | Weddington | 108/45 |
| 2,837,388 | 6/1958 | Majeroni et al. | 108/44 UX |
| 2,897,974 | 8/1959 | Cook | 108/44 UX |
| 2,986,438 | 5/1961 | Smathers et al. | 108/26 X |
| 3,638,849 | 2/1972 | Goings | 108/44 X |
| 3,690,724 | 9/1972 | Douglas et al. | 108/44 X |
| 4,174,669 | 11/1979 | Lalonde | 108/45 X |
| 4,359,004 | 11/1982 | Chappell | 108/44 |

Primary Examiner—J. Franklin Foss
Attorney, Agent, or Firm—Jacques M. Dulin

[57] ABSTRACT

A removably mountable and selectively positionable dashboard tray for holding food, utensils, debris, spillage or the like having an aperture specially adapted for releasable retentive engagement to a footholder for a footed cup or cupholder. Continuous upraised rims extend from both the outer edge of the dashboard tray and that portion of the dashboard tray which is adjacent to the aperture. The aperture adaptations include centering lugs and co-located shoulders in which a circle may be circumscribed whose diameter is smaller than the footholder. The centering lugs project into the aperture so that when the footholder is engaged herewith, the lugs flex away from the axis of the footholder to provide a releasable snap fit of the tray to the footholder.

18 Claims, 4 Drawing Figures

DASHBOARD TRAY

FIELD

The present invention relates to a removable and selectively positionable automobile dashboard tray device which engages a footholder for a footed beverage container. The dashboard tray can be used for receiving such items as foodstuffs, utensils, spillage or debris; all of which are normally associated with the consumption of a beverage. More particularly, this invention relates to a tray device having a hole therein which permits removable mounting and selective positioning of the tray device with respect to a footholder for a footed beverage container.

BACKGROUND OF THE INVENTION

It has become common practice for operators of motor vehicles, particularly automobiles, to consume beverages while driving. These beverages are typically consumed from cups. Many of these cups include a foot member which, when attached to a compatible footholder, will prevent the cup from being overturned. It has also become common for foodstuffs or smoking materials, such as a doughnut or a cigarette, respectively, to be consumed along with the beverage contained within the cup. Utensils, such as a stirring stick, may be used to mix sweetener or other additives with the beverage. Spillage can occur if the cup is overfilled or if the vehicle encounters a bump or pothole. Additionally, the driver may create debris such as a soiled napkin, an empty additive package or a spent match. At present there is no convenient surface in close proximity to the footed cup for receiving and containing foodstuffs, utensils, debris or other items normally associated with the drinking of a beverage. If not contained, debris such as ashes, frosting, sugar coating, grease or crumbs may soil the interior of the vehicle by falling onto the seats or the floorboard. Additionally, the debris may cause odors, produce unsightly stains on the upholstery or floor covering, attract insects or give a generally undesirable untidy appearance to the interior of the vehicle.

Several attempts have been made to provide tray devices which will contain both cups and foodstuffs, spillage, utensils or debris. These tray devices have been typically mounted to the vehicle in a relatively permanent fashion. They usually incorporate a hole or well for the insertion and retention of a beverage container and a flat surface or space for the receipt of foodstuffs, spillage, utensils or debris.

Representative of some typical motor vehicle tray devices providing both a place for receiving beverage containers and a space for receiving foodstuffs and the like, are U.S. Pat. No. 2,689,156 to Kolander; U.S. Pat. No. 2,829,779 to Weddington; U.S. Pat. No. Re. 27,688 to White, et al.; U.S. Pat. No. 4,174,669 to Lilonde; and U.S. Pat. No. 4,359,004 to Chappell. Each one of the aforementioned motor vehicle tray devices provides both a hole or well for the insertion of beverage containers and spaces or surfaces for the receipt of foodstuffs, utensils or debris. These devices are limited in their usefulness as they are specially designed to be either positioned on or fastened to a vehicle seat or mounted to saddle the driveshaft hump. The design of the tray devices for use in motor vehicles has been based on the particular configuration of the vehicle interior rather than on what would be most convenient for the driver or the passenger.

When a tray representative of the prior art is secured on a dashboard and a cup or cup holder is then secured to the tray, the tray cannot be easily removed separately from the cup or cup holder for cleaning. Likewise, the tray cannot be rotated to the best position for the driver or alternatively the the best position for a passenger, irrespective of the vehicle dashboard configuration.

The problem still remains in the art to provide a dashboard tray device that is both mountable on vehicle surfaces that are in close proximity to both the cup and the driver or passenger and at the same time will receive and contain foodstuffs, utensils, spillage, smoking materials, change or the like. Additionally, the tray device must be easily removable for cleaning but be compatible with separate securing means such as a holder for a footed beverage container. Adapability to utilization with a wide variety of dashboard configurations must be assured by making the tray positionable with respect to the footholder for the footed beverage container.

Additionally, the surface upon which the foodstuffs, utensils or debris is placed should be easily separable from the footholder for the footed beverage container so that it may be conveniently cleaned.

OBJECTS OF THE INVENTION

It is an object of the present invention to provide a dashboard tray device which is removably mountable and selectively positionable.

It is another object of the present invention to provide a dashboard tray device whose orientation toward the driver or passenger within a vehicle may be selectively adjusted irrespective of dashboard configuration.

It is another object of the present invention to provide a dashboard tray device which is capable of receiving and retaining foodstuffs, utensils, spillage or debris.

It is another object of the present invention to provide a dashboard tray device that may be easily removed and cleaned when not in use.

It is another object of the present invention to provide a dashboard tray device which engages and is retained by a footholder for a footed beverage container.

Still further and other objects will be evident from the description of the invention which follows.

SUMMARY

The dashboard tray device of the present invention is removably mountable to and dismountable from a footholder for a footed beverage container. The footholder is affixed on a dashboard or similar surface in a motor vehicle by double-sided tape. When mounted to the footholder, the tray device provides the driver or passengers in a motor vehicle a place for the receipt and containment of foodstuffs, utensils, spillage, or debris.

The footholder which is specially adapted to hold the foot of a footed beverage container is characterized as having a generally planar disc-shaped base. The base has a top surface, a bottom surface and an annular ring on its outer edge which projects above the top surface. A pair of ear members substantially parallel to the top surface project inwardly from the annular ring. The ear members form spaces which receive the foot of the footed beverage container on the footholder. The ears members also provide frictional engagement with the top of the foot so that the footed beverage container will be retained on the footholder in a continually upright position, particularly in a moving and vibrating vehicle. The footholder is positioned close to the driver or passenger in a vehicle by being affixed to a dashboard or similar surface; for example, by the use of double-sided tape. One side of the double-sided tape is adhesively affixed to the bottom surface or underside of the footholder, and the other side of the double-sided tape is adhesively affixed to a dashboard or similar surface in the vehicle.

Removably mountable to the footholder is the tray device of this invention for receiving and containing utensils, foodstuffs, spillage, debris or the like. An aperture or hole in the tray device is specially adapted to fit over the footholder. Centering lugs extend inwardly from the sides of the aperture in the tray device to frictionally engage the outer edge of the footholder. The centering lugs serve to both position the footholder in the aperture and permit selectively rotatable positioning of the footholder to provide the greatest convenience for the driver or passengers.

The tray device has a central flat portion which is bordered by an outer rim. This outer rim confines spillages to the flat portion and prevents debris from sliding off the tray device while the vehicle is moving. An inner rim circumscribes the aperture for the foot holder. This inner rim also confines spillage to the flat portion of the tray device and prevents either liquid or debris from falling through the aperture and soiling the interior of the vehicle.

The tray device may be easily removed from the footholder for cleaning by snapping it free. Replacement of the tray device on the footholder and repositioning it with respect to the footholder is accomplished by reversing the steps required to remove it for cleaning. The centering lugs within the aperture of the tray device both align the plane of the footholder with the plane of the base and allow the tray device to be turned with respect to the footholder and then remain in the position selected.

BRIEF DESCRIPTION OF THE DRAWINGS

A further understanding of the tray device of the present invention may be had by reference to the various figures wherein.

DETAILED DESCRIPTION OF THE PREFERRED EMBODIMENT

The following detailed description of the preferred embodiment of the invention is presented by way of example and not by way of limitation of the principles of this invention.

Figure 1:
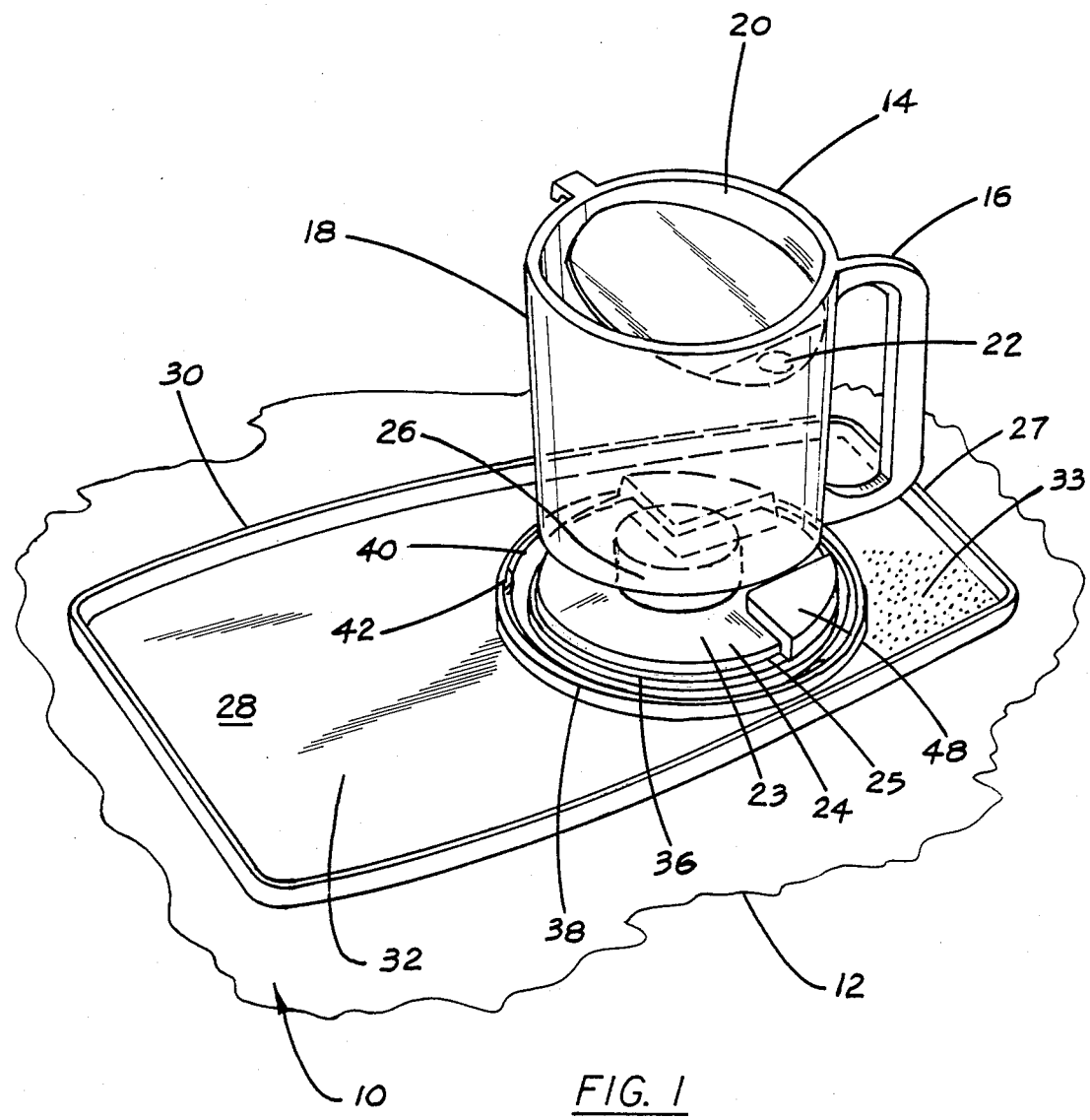
FIG. 1 is a perspective view of the tray device of the present invention operatively associated with a footholder in which is positioned a footed beverage container.

Referring to FIG. 1 dashboard tray assembly 10 generally consists of a tray device 28 and a footholder 35 for a footed beverage container 14. Tray device 28 comprises three principal parts: raised outer rim 30, raised inner rim 38 and a planar or flat tray portion 32. In the preferred embodiment planar or flat tray portion is shown as having a textured surface 33; however, it will be understood that the utilization of a smooth, textured or designed surface will not affect the operability of the tray device. The other cooperating parts important to the combination are disclosed more specifically below.

Figure 3:
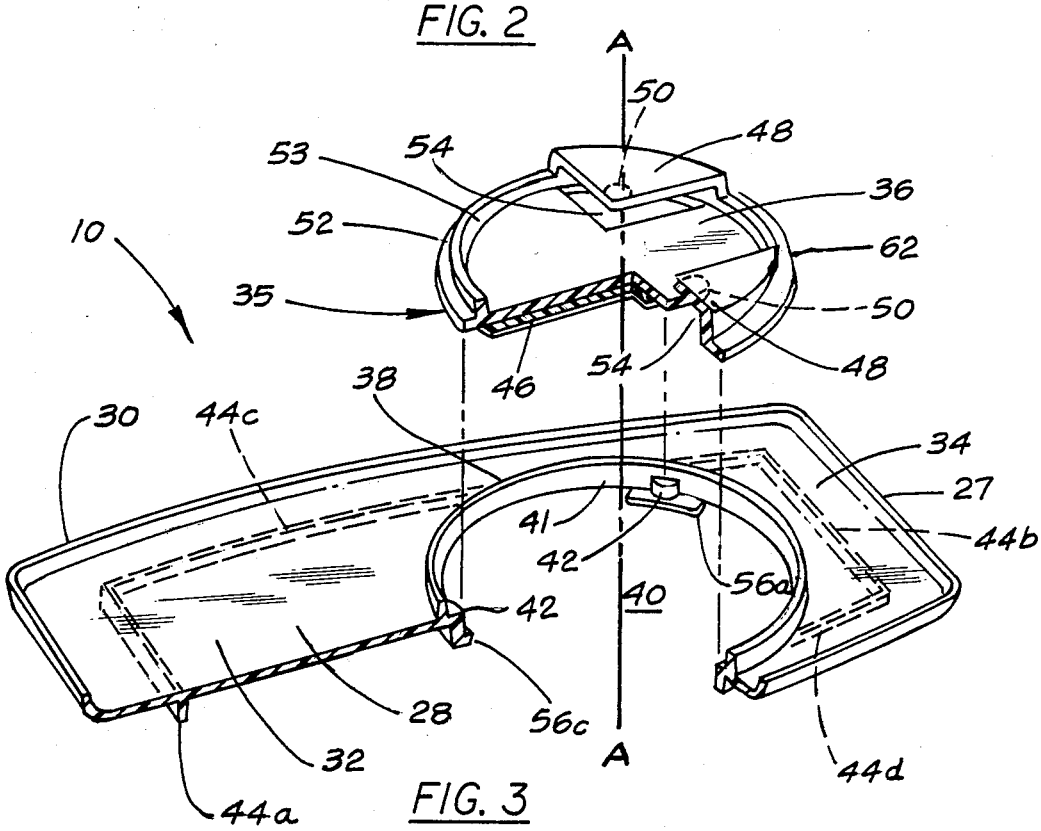
FIG. 3 is an exploded view partially in section of the tray device and footholder shown in FIG. 1.

As can be seen in FIGS. 1 and 3, footholder 35 is formed generally in the shape of a disc having generally planar central base member 36 having central axis A—A, an annular upraised outer rim 52 spaced adjacent to the outer edge 62 of the footholder 35. Projecting inwardly from the top surface of the rim 52 are ear members 48 which are substantially parallel to and spaced from central base member 36 and frictionally engage the foot 24 of footed beverage container 14. It will be understood that while footholder 35 is shown as a disc in the preferred embodiment, any regular or irregular polygon may be used. Other co-acting parts of the footholder are described below.

Figure 2:
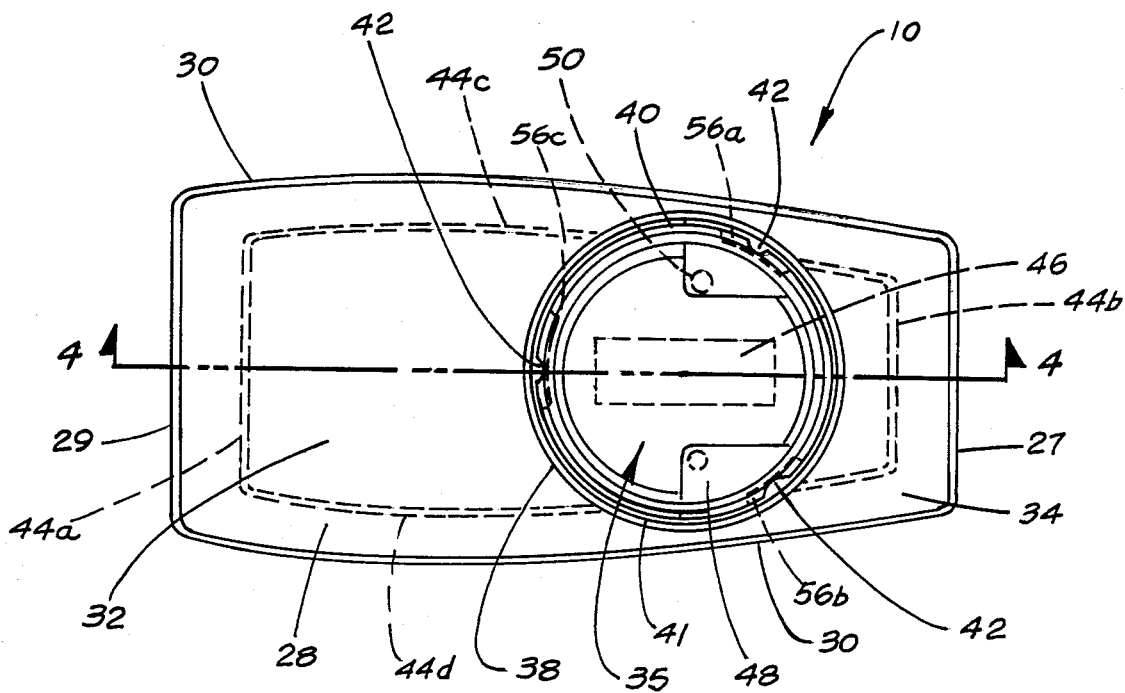
FIG. 2 is a top view of the tray device and footholder as shown in FIG. 1.

As can be further seen in FIGS. 2 and 3, tray device 28 is substantially rectangular in shape, and comprises planar tray portion 32 which is surrounded by a raised outer rim 30. While a rectangular shape is shown in the preferred embodiment, other shapes such as a square, oval, circle or a free form such as a kidney shape may be used without affecting the operability of the dashboard tray assembly 10.

As shown in FIGS. 2 and 3 tray device 28 has an aperture 40 which is shown as being positioned off center adjacent end 27. Aperture 40 has a central axis shown along line A—A. It is to be understood that while the positioning of aperture 40 in tray device 28 is not critical to the operability of dashboard tray assembly 10, it is extremely useful to the operation of the tray to have it adjacent one end, permitting easier access to the tray by the driver or passenger, depending on how the tray is selectively rotated toward the driver or passengers.

Surrounding aperture 40 is raised inner rim 38. Projecting into aperture 40 from the inner edge 41 thereof are a plurality of generally arcuate centering lugs 42 which engage the outer edge 62 of footholder 35. These centering lugs 42 permit selective angular positioning of tray device 28 with respect to footholder 35 by allowing rotation of the tray about the co-aligned central axis A—A of the footholder and the aperture. This selective angular positioning of the tray device 28 is effected providing minimal contact between centering lugs 42 and footholder 35 and dimensioning the centering lugs 42 so that a circle may be circumscribed therein. These two limitations allow performance of the following operational functions:

(a) positioning of the footholder 35 with respect to the perimeter of aperture 40;

(b) orientation of the plane of base member 36 substantially parallel to the plane of tray device 28;

(c) turning of the footholder 35 within aperture 40;

(d) retention of an angular position of tray device 28 with respect to footholder 35.

Specifically, the circle circumscribed with centering lugs 42 has a diameter slightly smaller than the diameter of footholder 35 thereby causing a snap-fit within aperture 40 and accomodation of a variation in the diameter of footholder 35 caused by molding variances.

The snap fit engagement of footholder 35 within aperture 40 provides a sufficient amount of frictional contact between centering lugs 42 and the outer edge 62 of footholder member 35 to permit rotative motion therebetween; but not so much frictional contact so that as upon rotation the snap fit is disengaged or released.

Enough friction is provided to permit retention of the tray without further movement in a particular position after it has been moved.

Referring specifically to FIG. 3, aperture 40 within tray device 28 is retained co-axially along central axis A—A with respect to footholder 35 by centering lugs 42. Tray device 28 is also retained coplanar to footholder 35 by shoulders 56 positioned under centering lugs 42. Shoulders 56 contact the underside of of the footholder 35 to prevent the footholder 35 from slipping through aperture 40 or falling away from contact with centering lugs 42. Together the centering lugs 42 and the shoulders 56 cooperate to frictionally engage and retain the footholder 35, within the tray device 28 and at the same time permitting rotation and selective positioning of the tray device 28 around axis A—A.

Figure 4:
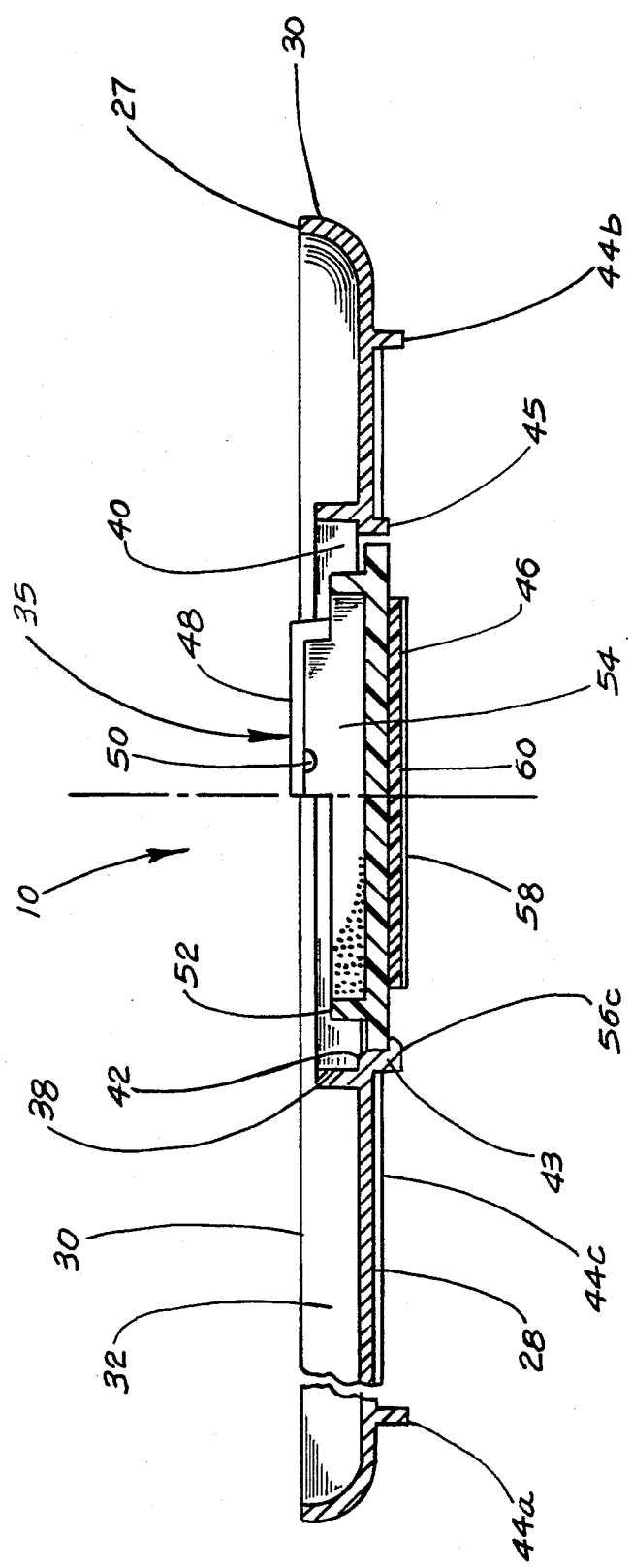
FIG. 4 is a sectional view along line 4—4 of FIG. 2.

As can be seen in FIG. 4 double-sided tape 46 is affixed to the bottom of footholder 35 to secure it to the appropriate vehicle surface. A raised support rail having sections 44a, 44b, 44c and 44d may be formed on the underside of tray device 28. Sections 44a and 44b located on either end of tray device 28 project away from the bottom of tray device 28 a greater distance than raised inner rim 38 projects from the top of tray device 28. This permits stacking of the trays so that raised inner rim 38 clears the corresponding raised inner rim of adjacent trays in the stack giving the stack of trays stability.

In operation the dashboard tray assembly 10 is mounted to a dashboard or similar surface by first removing cover strip 58 from double-sided tape 46 of footholder 36 (FIG. 4). This exposes adhesive surface 60 which is then adhesively affixed to a convenient surface in a motor vehicle such as a dashboard 12 as shown in FIG. 1. Once footholder 35 is secured to a dashboard or similar surface, tray device 28 is interlockingly engaged with footholder 35 by tilting the front of tray device 28 up so that one or more of the shoulders 56a, 56b or 56c move under outer edge 62. In the preferred embodiment shoulders 56a and 56b may be placed under outer edge 62 while shoulder 56c remains above outer edge 62. Centering lugs 42 center footholder 35 with respect to shoulders 56a, 56b and 56c so that all shoulders 56a, 56b, and 56c are under the bottom surface of footholder 35 when tray device is moved downward. The moving of the front 29 of tray device 28 downward so that it becomes coplanar with footholder 35 causes an outward flexing of centering lugs 42 at hinge point 43. In the preferred embodiment centering lugs 42 and shoulders 56a, 56b and 56c are positioned on a continuous inner rim 45 for added rigidity at hinge point 43. Tray device 28 may then be rotated into any angular position with respect to footholder 35. The outward flexing of centering lugs 42 at hinge point 43 provides a compressive force which allows for retention of tray device 28 in a selected angular position with respect to footholder 35.

Once dashboard tray assembly 10 has been mounted in an accessible position as shown in FIG. 1, a footed beverage container 14 having a handle 16, a pedestal stem 26 and a foot 24 may be positioned on footholder 35. This positioning is accomplished by sliding foot 24 into spaces 54 (FIG. 3) under ear members 48. Further positioning of container 14 on footholder 36 is accomplished by the contact of the inner surface 53 of annular upraised outer ring 52 with the outer edge 25 of foot 24. This positioning of container 14 with respect to footholder 35 brings bump members 50 into contact with the top side 23 of foot 24. Some containers such as 14 are also provided with an anti-slosh cover 20 which includes a hole 22 for drinking the beverage contained therein.

During operation of a motor vehicle, planar or flat tray portion 32 of tray device 28 may be used to receive and contain foodstuffs such as doughnuts or cookies or smoking materials such as a pack of cigarettes or a pipe. In addition utensils such as a stirring rod or straw may be kept in position near the footed beverage container 14 by placing them on tray device 28. Spillage from footed beverage container 14 or debris is confined to planar portion 32 of tray device 28 between raised outer rim 30 and raised outer rim 30 and raised inner rim 38. In this manner vehicle motion will not cause debris or spillage to slide off the outer edge of planar portion 32 or drop through aperture 40.

A particularly useful footed beverage holder is the universal holder for disposable beverage cups, containers and the like shown in my copending application Ser. No. 695,580, filed on Jan. 28, 1985, (case 84,604), the disclosure of which is hereby incorporated by reference.

It should be understood that shoulders 56a,b,c project into the circumscribed circle of the centering lugs in order prevent the footholder from slipping through aperture 40, and the faces thereof lie on a circumscribed circle smaller than that of the centering lugs 42.

The various components of dashboard tray assembly 10 are typically made of plastic, e.g., polystrene, polypropylane, an acrylic or other suitable injection moldable plasitc. In addition, other easily molded plastics such as ABS or polyurethane may be used. If desired, the surface of planar portion 32 may be textured or configured with an appropriate logo, advertising message or safety reminder.

The tray device of the present invention thereby provides a system for releasably mounting and selectively positioning a planar surface with respect to a footholder for a footed beverage container. Such planar surface is bordered by an inner and outer rim for containment of foodstuffs, utensils, spillage or debris within a vehicle.

While there is shown and described the preferred embodiment of the tray device of the present invention, it is to be understood that the specific structure described herein is susceptible of various changes and modifications and is to be limited only by the scope of the appended claims.

I claim:

1. A removably mountable and selectively positionable tray device for use with a footholder for a footed beverage container, comprising in operative combination:

a planar surface having an aperture therein;

said aperture being adapted to engage said footholder in releasable retentive engagement and to permit selective positioning of said planar surface in a desired angular position with respect to the axis of the footholder while remaining substantially coplanar therewith;

a continuous upraised rim extending from the outer edge of said planar surface; and a continuous upraised rim extending from the said planar surface adjacent said aperture.

2. A tray device of claim 1 wherein said aperture is substantially circular.

3. A tray device of claim 1 wherein said planar surface is substantially rectangular.

4. A tray device of claim 1 wherein said aperture is positioned off center within said planar surface.

5. A tray device of claim 4 wherein said aperture is substantially circular.

6. A tray device of claim 5 wherein said planar surface is substantially rectangular.

7. A removably mountable and selectively positionable tray device for use with a footholder for a footed beverage container for receiving foodstuffs, utensils, spillage or debris, comprising in operative combination:
   a. a planar surface having an aperture therein;
   b. said aperture being adapted to engage said footholder in releasable retentive engagement and to permit selective position of said planar surface in a desired angular position with respect to the axis of the footholder while remaining substantially coplanar therewith;
   c. a continuous upraised rim extending from the outer edge of said planar surface;
   d. a continuous upraised rim extending from the said planar surface adjacent said aperture; and
   e. said releasable retentive engagement and selective positioning of the planar surface is provided by a plurality of centering lugs in which a circle may be circumscribed whose diameter is smaller than the diameter of the footholder, said centering lugs projecting into said aperture whereby when said footholder is engaged with said planar surface said centering lugs will flex away from the axis of the footholder.

8. A tray device of claim 7 wherein said aperture further includes a plurality of shoulders.

9. A tray device of claim 8 wherein said shoulders are co-located with said centering lugs.

10. A tray device of claim 7 having three centering lugs.

11. A tray device of claim 9 having three shoulders.

12. A removably mountable and selectively positionable tray device for use with a footholder for a footed beverage container, comprising in operative combination:
   a. a substantially rectangular planar surface having a substantially circular aperture therein positioned off-center within said planar surface;
   b. said aperture being adapted to engage said footholder in releasable retentive engagement and to permit selective positioning of said planar surface in a desired angular position with respect to the axis of the footholder while remaining substantially coplanar therewith;
   c. a continuous upraised rim extending from the outer edge of said planar surface;
   d. a continuous upraised rim extending from the said planar surface adjacent said aperture; and
   e. said releasable retentive engagement and selective positioning of the planar surface is provided by a plurality of centering lugs in which a circle may be circumscribed whose diameter is smaller than the diameter of the footholder, said centering lugs projecting into said aperture whereby when said footholder is engaged with said planar surface said centering lugs will flex away from the axis of the footholder.

13. A tray device of claim 12 wherein said aperture further includes a plurality of shoulders.

14. A tray device of claim 13 wherein said shoulders are co-located with said centering lugs.

15. A system for intermittently retaining a beverage container with respect to a surface in a vehicle, comprising in operative combination:
   a beverage container having a pedestal and a foot portion;
   a substantially disc-shaped footholder having means for removably frictionally engaging the foot portion of said beverage container on one side and means for affixing said footholder to the surface in a vehicle on the other side;
   a planar surface having an aperture therein;
   said aperture being adapted to engage said footholder in releasable retentive engagement, and to permit selective positioning of the planar surface in desired angular position with respect to the axis of the footholder while remaining substantially co-planar therewith;
   a continuous upraised rim extending from the outer edge of said planar surface; and
   a continuous upraised rim extending from the said planar surface adjacent said aperture.

16. A system of claim 15 wherein said aperture is substantially circular.

17. The system of claim 15 wherein said aperture is positioned off center within said planar surface.

18. A system for intermittently retaining a beverage container with respect to a surface in a vehicle, comprising in operative combination:
   a. a beverage container having a pedestal and a foot portion;
   b. a substantially disc-shaped footholder having means for removably frictionally engaging the foot portion of said beverage container on one side and means for affixing said footholder to the surface in a vehicle on the other side;
   c. a planar surface having an aperture therein;
   d. said aperture being adapted to engage said footholder in releasable retentive engagement, and to permit selective positioning of the planar surface in desired angular position with respect to the axis of the footholder while remaining substantially coplanar therewith;
   e. a continuous upraised rim extending from the outer edge of said planar surface;
   f. a continuous upraised rim extending from the said planar surface adjacent said aperture; and
   g. said releasable retentive engagement and selective positioning of the planar surface is provided by a plurality of centering lugs in which a circle may be circumscribed whose diameter is smaller than the diameter of the footholder, said centering lugs projecting into said aperture whereby when said footholder is engaged with said planar surface said centering lugs will flex away from the axis of the footholder.

* * * * *